United States Patent
Hall et al.

[11] Patent Number: 6,137,702
[45] Date of Patent: Oct. 24, 2000

[54] CIRCUIT AND METHOD OF ACTIVATING AND DE-ACTIVATING A SWITCHING REGULATOR AT ANY POINT IN A REGULATION CYCLE

[75] Inventors: Jefferson W. Hall, Phoenix; Jade H. Alberkrack, Tempe, both of Ariz.

[73] Assignee: Semiconductor Components Industries, LLC, Phoenix, Ariz.

[21] Appl. No.: 09/304,307

[22] Filed: May 3, 1999

[51] Int. Cl.[7] .............................. H02M 3/24; G05F 1/40
[52] U.S. Cl. ........................ 363/95; 363/21; 323/284; 323/272
[58] Field of Search .................. 363/95, 21, 97, 363/47, 71, 131; 323/222, 285, 284, 272, 266

[56] References Cited

U.S. PATENT DOCUMENTS

| | | | |
|---|---|---|---|
| 4,825,144 | 4/1989 | Alberkrack et al. | 323/272 |
| 5,029,269 | 7/1991 | Elliott et al. | 363/21 |
| 5,130,561 | 7/1992 | Elliott et al. | 307/31 |
| 5,438,499 | 8/1995 | Bonte et al. | 363/21 |
| 5,940,287 | 8/1999 | Brkovic | 363/127 |

OTHER PUBLICATIONS

"Theory and Applications of the MC34063 and µA78S40 Switching Regulator Control Circuits", Jade Alberkrack, *Motorola Semiconductor Application Note 1989*, Document AN920/D Rev. 2, No Date.

"Switched Mode Power Supply Control Circuit", *Signetics Data Sheet*, SG1526A/SG2526A/SG3526A, Apr. 1984.

*Primary Examiner*—Peter S. Wong
*Assistant Examiner*—Rajnikant B. Patel
*Attorney, Agent, or Firm*—Michael T. Wallace

[57] ABSTRACT

A switching regulator (18) for use in a switching power supply (10) receives a feedback signal and provides a gate drive signal. The switching regulator enables the gate drive signal once at any point during a cycle of an oscillator signal by setting a first latch (74) upon receiving a non-asserted feedback signal. Setting the first latch triggers a pulse generator (78) to generate a pulse signal. The first latch is not reset until the end of the cycle of the oscillator signal. Therefore, the pulse generator can generate only one pulse per oscillator cycle. The pulse signal sets a second latch (80) that enables the gate drive signal. The switching regulator disables the gate drive signal by resetting the second latch. A power transistor (20) conducts an inductor current through the primary winding of the transformer (16) in response to the gate drive signal.

28 Claims, 2 Drawing Sheets

CIRCUIT AND METHOD OF ACTIVATING AND DE-ACTIVATING A SWITCHING REGULATOR AT ANY POINT IN A REGULATION CYCLE

BACKGROUND OF THE INVENTION

The present invention relates in general to power supply regulation and, more particularly, to a switching regulator capable of starting the on-time of a power transistor once and then terminating the on-time of the power transistor anytime during a charging phase of a regulation cycle.

Most if not all electronic devices require a DC voltage of appropriate level for proper operation. The DC voltage is typically derived from an AC power source, e.g. by plugging a power supply into a wall socket. The AC voltage available at the wall socket is converted to a DC bulk voltage by a full-wave rectifier diode bridge. The DC bulk voltage is further converted to a regulated DC output voltage by a switching power supply.

The switching power supply uses a transformer, or an inductor depending on the configuration, as an energy transfer element. For example, a flyback-type power supply has a power transistor coupled to one side of the primary winding of a transformer. The power transistor turns on and off as determined by a switching regulator circuit to alternately store energy in the magnetic field of the transformer and transfer the stored energy to the secondary winding. The secondary winding of the transformer develops an output voltage across a shunt capacitor coupled in series with a rectifier across the secondary winding as a function of the energy transfer. The voltage across the capacitor provides the DC output voltage of the switching power supply.

The DC output voltage increases and decreases inversely with the power consumed by or delivered to the applied load. An increasing load decreases the DC output voltage and a decreasing load increases the DC output voltage. The DC output voltage, or a representation thereof, is fed back to the switching regulator circuit to allow the switching power supply to compensate for load variation. As the load increases, the DC output voltage decreases which causes the switching regulator to leave the power transistor on for a longer period of time to store more energy in the magnetic field. This additional energy is transferred to the secondary winding during the off time of the power transistor to supply the increased load and re-establish the DC output voltage. As the load decreases, the DC output voltage increases which causes the switching regulator to leave the power transistor on for a shorter period of time in order to store less energy in the magnetic field. The reduced energy transfer to the secondary winding during the off time of the power transistor causes the power supply to adjust to the decreased load and reduces the DC output voltage back to its steady-state value.

Some prior art switching regulator circuits are configured as gated oscillators where the power transistor receives a fixed frequency control signal which is enabled or disabled in response to the feedback signal. Each regulation cycle of the gated oscillator is initiated by a clock pulse signal setting a latch. The clock pulse signal initiates the regulation cycle by enabling the gate drive signal, and correspondingly the on-time of the power transistor, if the feedback signal is not asserted. The gate drive signal is terminated either by a current limit sense signal detecting peak current in the power transistor, or by a falling edge of an oscillator signal resetting the latch. If the feedback signal is asserted during the time when a regulation cycle should start, i.e. at the rising edge of clock pulse, then the gate drive signal is not enabled as the clock pulse signal to the latch is blocked by the feedback signal. The power transistor is not turned on and no energy is stored in the magnetic field of the transformer during that regulation cycle.

The switching regulator can react to changes in output loading only at the start of the regulation cycle. For example, if the feedback signal is asserted at the beginning of the regulation cycle, indicating that the DC output voltage is already above the regulation threshold, then the power transistor is not turned on until at least the next regulation cycle. Therefore, if feedback information indicating an increasing load is delivered immediately following the clock pulse, the power transistor remains non-conductive during the regulation cycle even though the load is demanding more power.

The gate drive signal and on-time of the power transistor during the regulation cycle is typically terminated either by peak current limit or by maximum duty cycle. For example, if the feedback signal is not asserted during the regulation cycle, indicating that the DC output voltage is below the regulation threshold, then the power transistor is turned on at the beginning of the regulation cycle. The power transistor is not turned off until terminated by peak current limit or the end of the maximum duty cycle. Therefore, if feedback information indicates that a load is suddenly removed and the output voltage is increasing, the power transistor continues to store energy in the magnetic field until terminated by peak current limit or maximum duty cycle, even though the load requires no additional energy.

The narrow window of opportunity to initiate a regulation cycle by enabling the gate drive signal and the inability to terminate the gate drive signal as indicated by the feedback signal causes poor transient response to variations in output loading during the regulation cycle.

Hence, a need exists for a switching regulator circuit which can respond to variations in output loading anytime during the regulation cycle.

BRIEF DESCRIPTION OF THE DRAWINGS

FIGS. 3–7 are waveform plots useful in the explanation of the invention.

DETAILED DESCRIPTION OF THE PREFERRED EMBODIMENT

Figure 1:
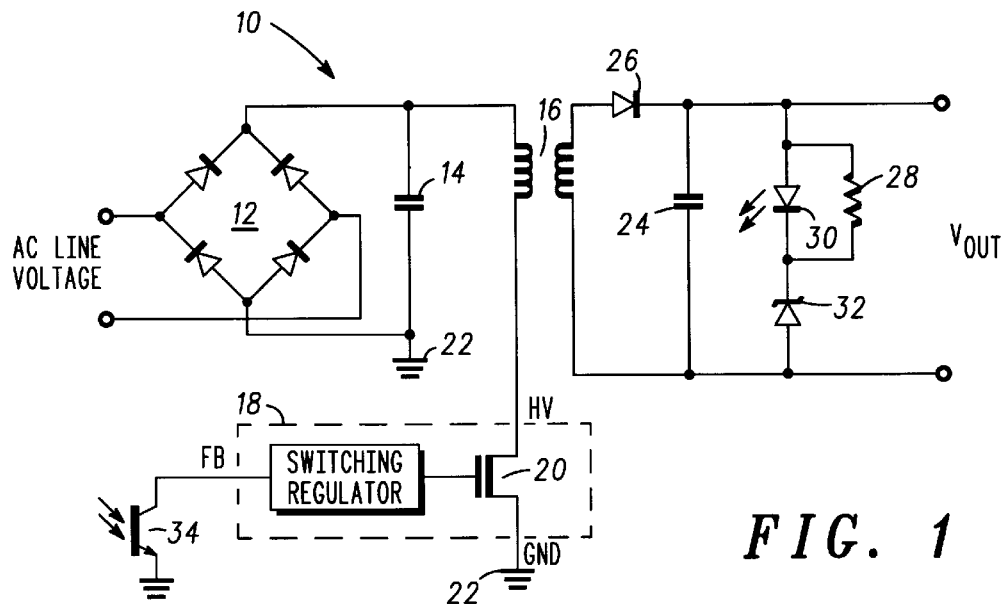
FIG. 1 illustrates a switching power supply using secondary side regulation.

Referring to FIG. 1, a switching power supply 10 is shown receiving an AC line voltage. The AC line voltage is converted to a DC bulk voltage by full-wave rectifier diode bridge 12. Capacitor 14 filters the DC bulk voltage. The primary winding of transformer 16 receives the DC bulk voltage. Regulator circuit 18 is typically implemented as an integrated circuit (IC) using conventional high voltage IC manufacturing processes. The IC package is typically a three or four pin device with one feedback (FB) pin as the feedback input to the switching regulator. A second high voltage (HV) pin is connected to the drain of power switching transistor 20 for coupling to high voltage on the primary winding of transformer 16. Power transistor 20 conducts an inductor current through the primary winding of transformer 16. A third ground (GND) pin is coupled to power supply conductor 22 operating at ground potential. A fourth pin (not shown) of the IC package may be coupled to a compensation or by-pass capacitor, or possibly a separate positive power supply input to the IC.

Power transistor 20 operates on regulation cycles controlled by switching regulator 18. When power transistor 20 conducts in a flyback mode configuration, an inductor current flows through the primary winding and stores energy in the magnetic field of transformer 16. When power transistor 20 is non-conductive, the energy stored in the magnetic field is transferred to the secondary winding. Capacitor 24 is coupled across the secondary winding of transformer 16 to develop a DC output voltage $V_{OUT}$. Diode 26 prevents current flow back into the secondary winding.

A current flows through resistor 28 and zener diode 32 under nominal operating conditions. Optical lightemitting diode (LED) 30 and photo-detection transistor 34 operate as an optical isolator to electrically isolate and optically couple the feedback information from capacitor 24 to the FB pin of switching regulator IC 18. If LED 30 is forward biased, then a current flowing through LED 30 generates a quantity of photons proportional to the current flow. The photons are received by the photo-detection base of transistor 34 to render it conductive. Transistor 34 attempts to conduct current from its collector to its emitter. However, since switching regulator 18 is only able to source limited current from its FB pin into the collector of transistor 34, transistor 34 saturates and the collector of transistor 34 is pulled to a low voltage. If LED 30 is not forward biased, then no photons are emitted from LED 30 leaving transistor 34 non-conductive and its collector high impedance.

The DC output voltage $V_{OUT}$ typically operates either slightly above or below a predetermined regulation threshold in response to output loading. The regulation threshold is set by the voltage across zener diode 32 plus the voltage across LED 30 when forward biased. When the output load is relatively large causing the DC output voltage $V_{OUT}$ to be below the regulation threshold, then the voltage across resistor 28 is such that LED 30 is not forward biased. Transistor 34 is non-conductive and the collector of transistor 34 is high impedance (feedback not asserted). An increase in the DC output voltage $V_{OUT}$ above the regulation threshold causes LED 30 to become forward biased. A current flows through LED 30 and generates a quantity of photons proportional to the current flow. The photons transferred to the base of transistor 34 are sufficient to render it conductive and pull its collector to a low voltage (feedback asserted). The low voltage on the collector of transistor 34, in response to the DC output voltage $V_{OUT}$ operating above the regulation threshold, represents feedback information that is provided to the FB pin of switching regulator IC 18. Switching regulator 18 provides a gate drive signal to the gate of power transistor 20 in response to the feedback signal to turn it on and off as necessary to regulate the DC output voltage $V_{OUT}$.

The regulation scheme shown in FIG. 1 is commonly called secondary side regulation because the feedback information is generated on the secondary side of the transformer. In the present embodiment, the feedback information is either asserted (low voltage) or not asserted (high impedance) depending on whether the DC output voltage $V_{OUT}$ is above or below the regulation threshold. Switching regulator 18 is configured to continue pushing the DC output voltage $V_{OUT}$ to a higher value when the feedback signal is not asserted. When the DC output voltage $V_{OUT}$ is greater than the regulation threshold and the feedback signal is asserted, then the feedback loop provides a low voltage to the FB pin which causes switching regulator 18 to disable the gate drive signal to power transistor 20 for one or more regulation cycles and hold the DC output voltage $V_{OUT}$ at the regulation threshold. Disabling the gate drive signal prevents power transistor 20 from conducting during a particular regulation cycle. Holding power transistor 20 off during one or more regulation cycles stores no additional energy in the magnetic field of the transformer. Consequently, no additional energy is transferred to the secondary winding and the DC output voltage $V_{OUT}$ decreases accordingly.

The present invention is also applicable to other feedback schemes including primary side sensing where another auxiliary winding (not shown) is used to generate the feedback signal.

Figure 2:
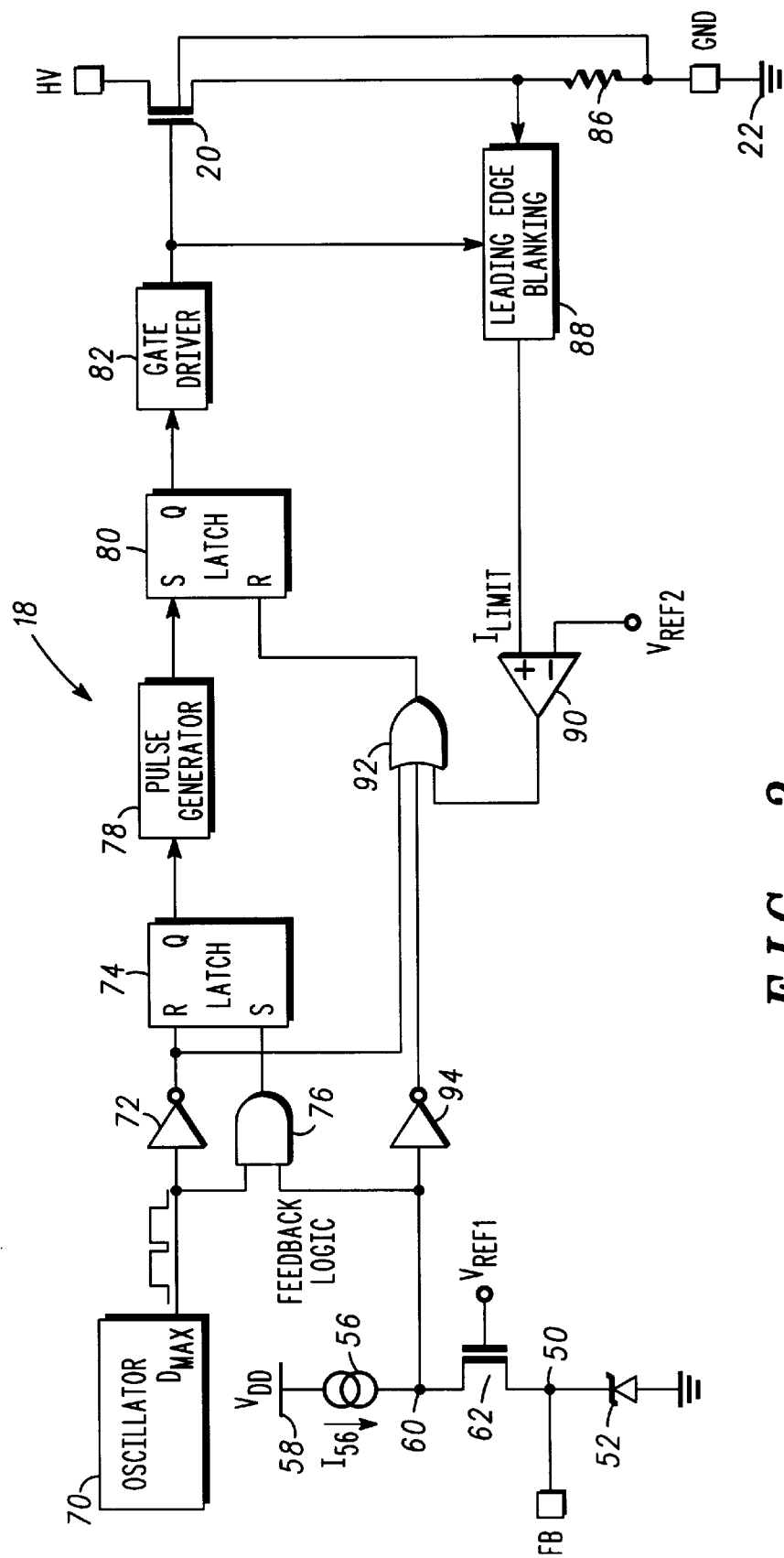
FIG. 2 illustrates the switching regulator circuit of FIG. 1.

Further detail of switching regulator 18 is shown in FIG. 2. The FB pin is coupled to node 50. Zener diode 52 is coupled to the FB pin for electro-static discharge (ESD) protection. Current source 56 is referenced to power supply conductor 58 operating at a positive potential such as $V_{DD}$=8 volts. Current source 56 sources a current $I_{56}$ into node 60. A reference voltage $V_{REF1}$, typically set to 3.5 volts, is applied to the gate of transistor 62. When transistor 34 is non-conductive and node 50 is high impedance, transistor 62 is non-conductive because the applied gate-source voltage ($V_{GS}$) is less than the turn-on threshold of the device. Current source 56 goes into saturation and pulls the FEEDBACK LOGIC signal at node 60 to a logic one.

If switching power supply 10 is configured for secondary side regulation as shown in FIG. 1, then when the DC output voltage $V_{OUT}$ is greater than the regulation threshold, LED 30 is forward biased and conducts a current to turn on transistor 34. The FB pin and node 50 are pulled to a low potential by the collector of transistor 34. The $V_{GS}$ applied to transistor 62 is now greater than its turn-on threshold. Transistor 62 conducts a current greater than the current $I_{56}$ which causes the FEEDBACK LOGIC signal at node 60 to switch to logic zero.

Current source 56 and transistor 62 operate as a feedback detector circuit. When the signal on node 50 is greater than a value with respect to the reference voltage $V_{REF1}$, such that the $V_{GS}$ of transistor 62 is less than the turn-on threshold of the device, then transistor 62 is non-conductive and current source 56 sets the output detect signal of the detector, i.e. node 60, to a first logic state. In this case, the first logic state of the output detector signal indicates that the feedback signal on the FB pin is not asserted and node 50 is not being driven by transistor 34 in secondary side regulation. Switching regulator 18 is allowed to generate a gate drive signal to turn on power transistor 20. When the signal on the FB pin is less than a value with respect to the reference voltage $V_{REF1}$, such that the $V_{GS}$ of transistor 62 exceeds the turn-on threshold of the device, then transistor 62 conducts and sets the output detect signal of the detector to a second logic state. If the turn-on threshold of transistor 62 is 1.2 volts, then that value of the feedback signal necessary to turn on transistor 62 and set the output detect signal of the detector to the second logic state is 3.5−1.2=2.3 volts (or less). In this case, the feedback signal on the FB pin is asserted by transistor 34. The second logic state of the output detector signal indicates that the feedback signal on the FB pin is asserted. Switching regulator 18 is controlled to disable the gate drive signal to power transistor 20 because the DC output voltage $V_{OUT}$ is above the regulation threshold. The output detect signal causes one or more regulation cycles of power transistor 20 to be skipped so that the energy transfer to the secondary winding is reduced to bring the DC output voltage $V_{OUT}$ back to its desired value.

Switching regulator 18 is configured as a gated oscillator or cycle skipper with a fixed frequency gate drive signal. The gate drive signal is either enabled or disabled by the regulator. The present invention is also applicable to pulse width modulator type regulators as would be readily apparent to one skilled in the art by the subject disclosure.

Oscillator 70 produces an oscillator signal, DMAX, typically having a fixed frequency of 100 KHz and duty cycle of 70% as shown in FIG. 3. The high portion of the DMAX signal defines the charging phase of the regulation cycle of power transistor 20. In the charging phase of the regulation cycle, power transistor 20 is either conducting or non-conducting in response to the feedback signal and the peak current through the power transistor. The energy stored in the magnetic field of the transformer is transferred to the secondary winding and the load during the energy transfer phase. The energy transfer phase is the portion of the charging phase of the regulation cycle when power transistor 20 is not conducting and the low portion of the DMAX signal.

The DMAX signal is inverted by inverter 72 and applied to the reset input of RS latch 74. RS latch 74 may also be implemented as a flipflop, register, or any other such information storage device. RS latch 74 is set dominate meaning that in the case of simultaneous set and reset signals, the set signal dominates. The FEEDBACK LOGIC signal and the DMAX signal are applied to inputs of AND gate 76. The output of AND gate 76 is coupled to the set input of RS latch 74. The Q-output of RS latch 74 is set to logic one on the rising edge of DMAX when the FEEDBACK LOGIC signal is logic one. If the FEEDBACK LOGIC signal is logic zero, then transistor 34 has asserted the feedback signal in response to the DC output voltage $V_{OUT}$ being greater than the regulation threshold. In that case, the logic zero FEEDBACK LOGIC signal blocks the DMAX oscillator signal from setting RS latch 74. AND gate 76 operates as a blocking circuit to block DMAX when FEEDBACK LOGIC is logic zero. The logic one on the Q-output of RS latch 74 triggers pulse generator 78, commonly known as a one shot circuit, which delivers a pulse to the set input of RS latch or flipflop 80. RS latch 80 is reset dominate meaning that in the case of simultaneous set and reset signals, the reset signal dominates. The implementation of a pulse generation circuit or one shot circuit which generates a pulse signal upon receiving an enable signal is known in the art. Upon receiving the pulse from pulse generator 78 on its set input, the Q-output of RS latch 80 goes to logic one. The Q-output of RS latch 80 is coupled to an enable input of gate driver 82 to enable gate driver 82 to provide a gate drive signal to power transistor 20. Power transistor 20 conducts current through the primary winding of transformer 16 via the HV pin when it receives a high gate drive signal.

Power transistor 20 is typically implemented with a first source conduction terminal coupled to the GND pin which conducts the majority of the inductor current. A second source terminal of power transistor 20 conducts a minority of the inductor current. The second source terminal includes resistor 86 operating as a current sensing circuit. A portion of the current flowing through power transistor 20 also flows through resistor 86. Therefore, the voltage across resistor 86 is a sense signal indicative of current flow through the power transistor. Separating the main current conduction path from the sense current conduction path allows for effective sensing of primary current without adding a sense resistor in the main current path which would cause decreased operating efficiency.

The voltage across resistor 86 is fed back through leading edge blanking circuit 88. Further detail of leading edge blanking circuit 88 is disclosed in U.S. Pat. No. 5,418,410 and hereby incorporated by reference. Briefly, leading edge blanking circuit 88 inhibits current sensing during a portion of the rising edge of the gate drive signal to power transistor 20. When the current sense signal $I_{LIMIT}$ exceeds the reference voltage $V_{REF2}$, then the output of comparator 90 switches to logic one. The reference voltage $V_{REF2}$ is typically set to 0.5 volts. The output of comparator 90 is coupled to one input of OR gate 92. A second input of OR gate 92 is coupled to the output of inverter 72, and a third input of OR gate 92 is coupled to the output of inverter 94, which is an inverted FEEDBACK LOGIC signal. The output of OR gate 92 is coupled to the reset input of RS latch 80.

In an alternate embodiment, the Q-output of RS latch 74 is coupled to the set input of RS latch 80, i.e. without pulse generator 78. In this case, RS latch 80 is an edge triggered memory element that sets its Q-output to a high state once only during the charging phase of the regulation cycle.

The waveform plot shown in FIG. 4 represents the voltage across resistor 86 or the current through power transistor 20. The voltage across resistor 86 also corresponds indirectly to the gate drive signal. Assume the FEEDBACK LOGIC signal is logic one indicating that the DC output voltage is less than the regulation threshold. On the rising edge of DMAX, RS latch 74 is set, thereby triggering pulse generator 78 and setting RS latch 80. Gate driver 82 provides a gate drive signal to turn on power transistor 20.

The waveform in FIG. 4 ramps to a peak current value $I_{LIMIT}$ between time $t_0$ and time $t_1$. When $I_{LIMIT}$ reaches peak current, the voltage across resistor 86 exceeds $V_{REF2}$ and the output of comparator 90 goes to logic one. The output of OR gate 92 changes to logic one and resets RS latch 80. The Q-output of RS latch 80 goes to logic zero which disables gate driver 82 and terminates the gate drive signal to power transistor 20 before the end of the charging phase of the regulation cycle. The gate drive signal and on-time of power transistor 20 is thus terminated by comparator 90 detecting peak current through resistor 86 anytime during the charging phase of the regulation cycle.

The waveform in FIG. 4 also demonstrates termination of the gate drive signal and on-time of power transistor 20 when switching regulator 18 reaches maximum duty cycle. Another gate drive signal starts at time $t_2$ and the voltage across resistor 86 ramps up between times $t_2$ and $t_3$. However, by time $t_3$, the current through power transistor 20 has not reached peak current limit. Therefore, comparator 90 never changes state to terminate the gate drive signal. On the falling edge of the DMAX signal at time $t_3$, the output of inverter 72 goes to logic one to reset RS latch 74. The output of inverter 72 also switches the output of OR gate 92 to logic one and resets RS latch 80. The Q-output of RS latch 80 goes to logic zero which disables gate driver 82 and terminates the gate drive signal to power transistor 20. The gate drive signal and on-time of power transistor 20 is thus terminated by switching regulator 18 reaching maximum duty cycle. FIG. 4 illustrates control of the trailing edge of the gate drive signal, i.e. as seen by the abrupt drop in the voltage across resistor 86, at any point during the charging phase of the regulator.

The waveform in FIG. 5 demonstrates termination of the gate drive signal and on-time of power transistor 20 when switching regulator 18 detects an output voltage change that can be caused by a load transient. Assume the feedback signal is not asserted at time $t_0$. The FEEDBACK LOGIC signal is logic one. The output of OR gate 92 is logic zero. The output of AND gate 76 provides a rising edge with DMAX and sets the output of latch 74. Latch 74 triggers pulse generator 78 and sets latch 80. Latch 80 enables gate driver 82 and power transistor 20 begins conducting the inductor current. The inductor current through resistor 86 ramps up as shown in FIG. 5.

At anytime during the charging phase of the regulation cycle between times $t_0$ and $t_1$, switching power supply 10 may receive an output voltage change partially from a sudden or dramatic decrease in the applied load. The DC output voltage $V_{OUT}$ increases accordingly and LED 30 becomes forward biased. Transistor 34 turns on to assert the feedback signal and pulls node 50 to a low voltage. Transistor 62 turns on and pulls the FEEDBACK LOGIC signal at node 60 to a logic zero. The logic zero FEEDBACK LOGIC signal is inverted by inverter 94 and switches the output of OR gate 92 to logic one which resets RS latch 80. The Q-output of RS latch 80 goes to logic zero which disables gate driver 82 and terminates the gate drive signal to power transistor 20. Thus, the gate drive signal and on-time of power transistor 20 can be terminated anytime during the charging phase of the regulation cycle in response to asserting the feedback signal. FIG. 5 further illustrates controlling of the trailing edge of the gate drive signal by the abrupt drop in the voltage across resistor 86 at any point during the charging phase of the regulator.

The waveform in FIG. 6 demonstrates the case where the FEEDBACK LOGIC signal initially blocks the start of the gate drive signal at time $t_0$ because the DC output voltage $V_{OUT}$ is greater than the regulation threshold. LED 30 is forward biased and transistor 34 is conducting. The feedback signal is asserted which pulls node 50 to a low voltage and turns on transistor 62. The FEEDBACK LOGIC signal goes to logic zero. With the FEEDBACK LOGIC signal at logic zero, AND gate 76 blocks the rising edge of DMAX and inhibits setting latch 74. Pulse generator 78 is not triggered, latch 80 is not set, and gate driver 82 is not enabled. The gate drive signal and on-time of power transistor 20 is not initiated at the rising edge of DMAX.

During the regulation cycle, the DC output voltage $V_{OUT}$ becomes less than the regulation threshold possibly in response to a load transient to switching power supply 10 in the form of a sudden or dramatic increase in the applied load. Anytime between times $t_0$ and $t_1$, the increasing load transient is applied and DC output voltage $V_{OUT}$ decreases. LED 30 is no longer forward biased and transistor 34 turns off. Transistor 62 turns off and the FEEDBACK LOGIC signal at node 60 goes to logic one. The output of AND gate 76 switches to logic one and sets RS latch 74. The Q-output of RS latch 74 goes to logic one and triggers pulse generator 78. Pulse generator 78 generates a pulse to set the Q-output of RS latch 80 to logic one and enable gate driver 82 to provide the gate drive signal and turn on power transistor 20. The voltage across resistor 86 ramps up sometime after time $t_0$ as shown in FIG. 6.

The waveform in FIG. 6 further demonstrates the termination sequence of the gate drive signal and accordingly the on-time of power transistor 20 as discussed above. The waveform reaches peak current before time $t_1$. $I_{LIMIT}$ exceeds the reference voltage $V_{REF2}$ and the output of comparator 90 switches to logic one. OR gate 92 resets RS latch 80. The Q-output of RS latch 80 goes to logic zero which disables gate driver 82 and terminates the gate drive signal to power transistor 20. The gate drive signal and on-time of power transistor 20 is terminated by resistor 86 detecting peak current anytime during the charging phase of the regulation cycle.

The waveform in FIG. 6 also demonstrates termination of the gate drive signal and the on-time of power transistor 20 when switching regulator 18 reaches maximum duty cycle. Another gate drive signal starts anytime after time $t_2$. As discussed above, the start of the gate drive signal and on-time of power transistor 20 is delayed until the feedback signal is no longer asserted. Once the feedback signal is released sometime after time $t_2$, the voltage across resistor 86 ramps up. However, by time $t_3$, the current through power transistor 20 has not reached peak current limit. Therefore, comparator 90 never changes state to terminate the gate drive signal. On the falling edge of the DMAX signal at time $t_3$, the output of inverter 72 goes to logic one to reset RS latch 74. The output of inverter 72 also sets the output of OR gate 92 to logic one and resets RS latch 80. The Q-output of RS latch 80 goes to logic zero which disables gate driver 82 and terminates the gate drive signal to power transistor 20. The gate drive signal is thus terminated by switching regulator 18 reaching maximum duty cycle even though the on-time of power transistor 20 is delayed from the rising edge of DMAX. FIG. 6 illustrates control of the leading edge of the gate drive signal, i.e. as seen by the start of the ramp waveform across resistor 86, at any point during the charging phase of the regulator.

The waveform in FIG. 7 demonstrates the case of a delayed start of the gate drive signal and on-time of power transistor 20 until the feedback signal is released and early termination of the gate drive signal and on-time of power transistor 20 if the feedback signal is re-asserted during the same regulation cycle. Each of these scenarios have been discussed independently and individually above and follow the same sequence. The gate drive signal and on-time of power transistor 20 can be started anytime during the high state of DMAX by AND gate 76 receiving a logic one FEEDBACK LOGIC signal and setting RS latch 74. The gate drive signal and on-time of power transistor 20 can be terminated anytime during the regulation cycle by OR gate 92 receiving a logic one signal from inverter 94 (inverted logic zero FEEDBACK LOGIC signal) to reset RS latch 80.

FIG. 7 illustrates control of the leading edge and the trailing edge of the gate drive signal, by the start and abrupt drop of the ramp waveform across resistor 86, at any point during the charging phase of the regulator. In the above discussion, notice that the control of the leading edge is independent of the control of the trailing edge. The leading edge of the gate drive signal can be started any time (before the trailing edge) in the charging phase irrespective of where the gate drive signal is terminated. Likewise, the control of the trailing edge is independent of the control of the leading edge. The trailing edge of the gate drive signal can be terminated any time (after the leading edge) in the charging phase irrespective of where the gate drive signal is started.

An important feature of the present invention is to avoid multiple on-times of power transistor 20 during any one particular regulation cycle. To accomplish this function, RS latch 74 receives its set input from AND gate 76. The output signal of AND gate 76 has a rising edge to set RS latch 74 when DMAX has a rising edge and FEEDBACK LOGIC is logic one or when FEEDBACK LOGIC has a rising edge and DMAX is logic one. Thus, RS latch 74 can be set anytime during the charging phase of the regulation cycle. RS latch 74 receives its reset input from inverter 72 as an inverted DMAX. RS latch 74 is reset when DMAX is low. Once the Q-output of RS latch 74 is set high, it cannot be set high again until it is reset which only occurs at the end of the regulation cycle. Additional positive pulses after the first positive pulse on the set input of RS latch 74 does not change the state of its Q-output. The rising edge from the Q-output of RS latch 74 triggers pulse generator 78 to generate a pulse. Pulse generator 78 receives a rising edge when the Q-output of RS latch 74 is set which can only occur once during any given regulation cycle.

The pulse generated by pulse generator 78 sets the Q-output of RS latch 80 to enable gate driver 82 to provide the gate drive signal and start the on-time of power transistor 20. Once RS latch 80 is set, it is reset by the low state of DMAX corresponding to maximum duty cycle, or by the feedback signal being asserted corresponding to a logic zero FEEDBACK LOGIC signal, or by peak current limit corresponding to $I_{LIMIT}$ exceeding reference voltage $V_{REF2}$. Once RS latch 80 is reset, it cannot be set again during the remainder of the regulation cycle because the Q-output of RS latch 74 is not reset until the end of the regulation cycle. Pulse generator 78 generates a pulse to set RS latch 80 only upon setting the Q-output of RS latch 74 which occurs only once per regulation cycle.

In summary, the present invention provides a switching regulator for use in a switching power supply. The switching regulator receives a feedback signal at a first pin of the integrated circuit and provides a gate drive signal. The switching regulator enables the gate drive signal once at any point during a cycle of the oscillator signal by setting a first latch upon receiving the feedback signal non-asserted. Setting the first latch triggers a pulse generator to generate a pulse signal. The first latch is not reset until the end of the cycle of the oscillator signal. Therefore, the pulse generator can generate only one pulse per oscillator cycle. The pulse signal sets a second latch that enables the gate drive signal. The switching regulator disables the gate drive signal by resetting the second latch upon receiving the feedback signal asserted during the charging phase of the regulator, or upon receiving a predetermined value of a sense signal indicative of current flow through the power transistor, or upon detecting the end of the charging phase of the regulation cycle. A power transistor conducts an inductor current through the primary winding of the transformer in response to the gate drive signal. The switching regulator can start the gate drive signal and on-time of the power transistor once anytime during the oscillator cycle and terminate the gate drive signal and on-time of the power transistor once anytime during the oscillator cycle in response to the feedback signal.

Another advantage of the present invention is that the control signal to the power transistor can be asynchronous with respect to the oscillator signal and therefore can be asserted at a frequency different than the oscillator signal as required by the load. The spectral energy generated by the power transistor is spread over a wider frequency band thereby reducing RFI and EMI filter requirements.

What is claimed is:

1. In a power supply, a regulator circuit providing a drive signal in response to a feedback signal to regulate an output voltage of the power supply, the regulator circuit comprising:
   a first information storage device having a first input coupled for receiving an oscillator signal and a second input coupled for receiving the feedback signal; and
   a second information storage device having a first input coupled to an output of the first information storage device, a second input coupled for receiving the feedback signal, and an output providing the drive signal.

2. The regulator circuit of claim 1, further including a pulse generator having an input coupled to an output of the first information storage device and an output coupled to the first input of the second information storage device.

3. The regulator circuit of claim 1, further including a power transistor having a first and second conduction terminals coupled for conducting an inductor current and having a control terminal coupled for receiving the drive signal.

4. The regulator circuit of claim 3, further including a logic gate having a first input coupled for receiving the feedback signal, a second input coupled for receiving a sense signal indicative of current flow through the power transistor, and an output coupled to the second input of the second information storage device.

5. The regulator circuit of claim 4, wherein the logic gate further includes a third input coupled for receiving the oscillator signal.

6. The regulator circuit of claim 5, further including:
   a current sense circuit coupled to a conduction terminal of the power transistor for providing the sense signal indicative of current flow through the power transistor; and
   a comparator having a first input coupled for receiving the sense signal, a second input coupled for receiving a reference voltage, and an output coupled to the third input of the logic gate.

7. The regulator circuit of claim 1, further including a logic gate having a first input coupled for receiving the feedback signal, a second input coupled for receiving the oscillator signal, and an output coupled to the second input of the first information storage device.

8. An integrated circuit, comprising a switching regulator coupled for receiving a feedback signal at a first pin of the integrated circuit and providing a drive signal, wherein the switching regulator enables the drive signal at any point during a charging phase of the switching regulator upon receiving the feedback signal and disables the drive signal at any point during a charging phase of the switching regulator.

9. The integrated circuit of claim 8, further including a power transistor having a first and second conduction terminals coupled to second and third pins of the integrated circuit for conducting an inductor current and having a control terminal coupled for receiving the drive signal.

10. The integrated circuit of claim 9, wherein the switching regulator includes:
    a first latch having a first input coupled for receiving an oscillator signal, and a second input coupled for receiving the feedback signal;
    a pulse generator having an input coupled to an output of the first latch; and
    a second latch having a first input coupled to an output of the pulse generator, a second input coupled for receiving the feedback signal, and an output providing the drive signal.

11. The integrated circuit of claim 10, wherein the switching regulator further includes:
    a logic gate having a first input coupled for receiving the feedback signal, a second input coupled for receiving a sense signal indicative of current flow through the power transistor, a third input coupled for receiving the oscillator signal, and an output coupled to the second input of the second latch;
    a current sense circuit coupled to a conduction terminal of the power transistor for providing the sense signal indicative of current flow through the power transistor; and
    a comparator having a first input coupled for receiving the sense signal, a second input coupled for receiving a reference voltage, and an output coupled to the third input of the logic gate.

12. The integrated circuit of claim 11, wherein the switching regulator further includes a logic gate having a first input coupled for receiving the feedback signal, a second input coupled for receiving the oscillator signal, and an output coupled to the second input of the first latch.

13. A method of operating a regulator circuit, comprising the steps of:

enabling a drive signal at any point during a charging phase of the regulator circuit upon receiving a feedback signal; and disabling the drive signal at any point during the charging phase of the regulator circuit.

14. The method of claim 13 further including the step of conducting an inductor current through a power transistor in response to the drive signal.

15. The method of claim 14, wherein the step of enabling a drive signal includes the steps of:

setting a first information storage device upon receiving the feedback signal during a portion of the charging phase of the regulator circuit; and resetting the first information storage device at an end of the charging phase of the regulator circuit.

16. The method of claim 15, wherein the step of enabling a drive signal further includes the steps of:

generating a pulse signal upon setting the first information storage device; and setting a second information storage device in response to the pulse signal.

17. The method of claim 16, wherein the step of disabling a drive signal includes the step of resetting the second information storage device upon receiving the feedback signal.

18. The method of claim 17, wherein the step of disabling a drive signal further includes the step of resetting the second information storage device upon receiving a predetermined value of a sense signal indicative of current flow through the power transistor.

19. The method of claim 18, wherein the step of disabling a drive signal further includes the step of resetting the second information storage device upon receiving an end of the charging phase of the regulator circuit.

20. A method of operating a regulator, comprising the steps of:

generating a drive signal in the regulator;

controlling a leading edge of the drive signal at any point during a charging phase of the regulator; and controlling a trailing edge of the drive signal at any point during the charging phase of the regulator independent of control of the leading edge of the drive signal.

21. The method of claim 20 further including the step of conducting an inductor current through a power transistor in response to the drive signal.

22. The method of claim 21 wherein the step of controlling a leading edge of the drive signal includes the step of enabling a drive signal at any point during the charging phase of the regulator upon receiving a feedback signal.

23. The method of claim 22 wherein the step of controlling a trailing edge of the drive signal includes the step of disabling the drive signal at any point during the charging phase of the regulator.

24. The method of claim 23, wherein the step of enabling a drive signal includes the steps of:

setting a first information storage device upon receiving the feedback signal during a portion of the charging phase of the regulator; and resetting the first information storage device at an end of the charging phase of the regulator.

25. The method of claim 24, wherein the step of enabling a drive signal further includes the steps of:

generating a pulse signal upon setting the first information storage device; and setting a second information storage device in response to the pulse signal.

26. The method of claim 25, wherein the step of disabling a drive signal includes the step of resetting the second information storage device upon receiving the feedback signal.

27. The method of claim 26, wherein the step of disabling a drive signal further includes the step of resetting the second information storage device upon receiving a predetermined value of a sense signal indicative of current flow through the power transistor.

28. The method of claim 27, wherein the step of disabling a drive signal further includes the step of resetting the second information storage device upon receiving an end of the charging phase of the regulator.

* * * * *